(No Model.)
F. H. BOLTE.
VEHICLE WHEEL.
No. 500,368. Patented June 27, 1893.
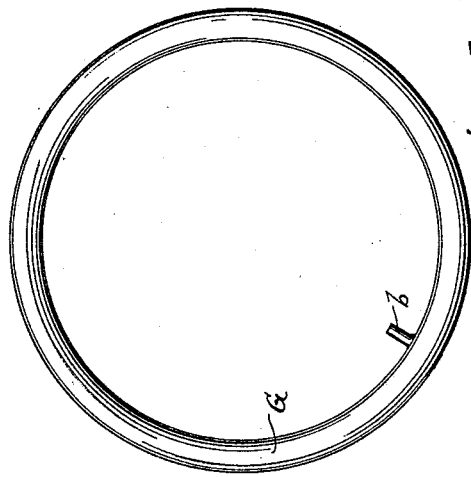
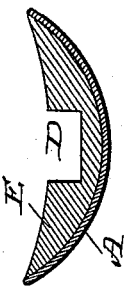
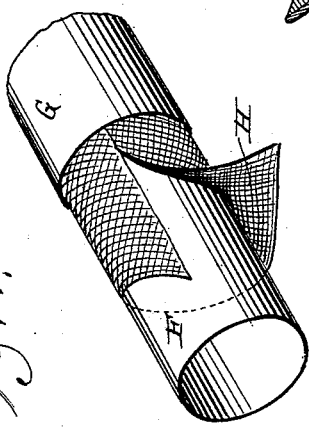
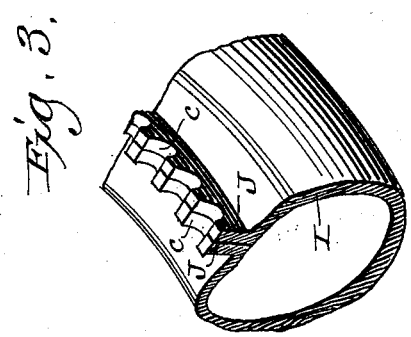
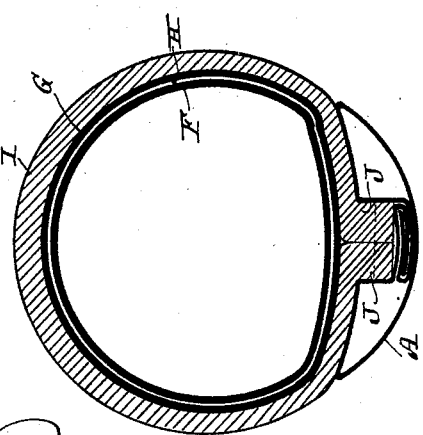
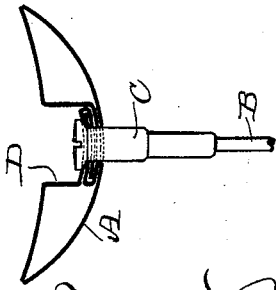
Witnesses
Geo. W. Young.
N. E. Oliphant
Inventor
Frank H. Bolte,
By H. G. Underwood.
Attorney

UNITED STATES PATENT OFFICE.

FRANK H. BOLTE, OF MILWAUKEE, WISCONSIN, ASSIGNOR TO THE SERCOMBE-BOLTE MANUFACTURING COMPANY, OF SAME PLACE.

VEHICLE-WHEEL.

SPECIFICATION forming part of Letters Patent No. 500,368, dated June 27, 1893.

Application filed August 11, 1892. Serial No. 442,783. (No model.)

*To all whom it may concern:*

Be it known that I, FRANK H. BOLTE, a citizen of the United States, and a resident of Milwaukee, in the county of Milwaukee, and in the State of Wisconsin, have invented certain new and useful Improvements in Vehicle-Wheels; and I do hereby declare that the following is a full, clear, and exact description thereof.

My invention has for its object to provide a light, strong wheel, especially designed for bicycles or analogous vehicles; and it consists in certain peculiar features of construction pertaining to the rim and tire of said wheel, as will be hereinafter described with reference to the accompanying drawings and subsequently claimed.

In the drawings: Figure 1 represents a transverse section of a wheel-rim and tire constructed according to my invention; Fig. 2, a similar view of the rim showing a spoke nipple engaged therewith; Fig. 3, a detail perspective view of a portion of the tire; Fig. 4, a similar view of another portion of the tire; Fig. 5, a plan view of this latter portion of the aforesaid tire; and Fig. 6, a transverse section of another form of rim than that previously illustrated.

Referring by letter to the drawings, A represents a wheel-rim constructed according to my invention, this rim being preferably hollow and made from a single piece of sheet-metal having its longitudinal edges folded and hooked together to form a central seam, the tube thus formed being bent in such a manner as to tightly close said seam against the opposite surface of the metal, whereby there are five thicknesses of this metal laid close together midway of the rim, in transverse section, throughout the line of the greatest strain, this strain being caused by the tension of spokes B fitted to nipples C, which latter engage openings at intervals of the thickened portion of said rim.

I am aware, of a hollow rim made from a single piece of sheet-metal having its edges seamed together in such a manner as to have four thicknesses of the metal on the spoke line, but in this rim the seam is necessarily exposed, while by my construction I conceal the seam and obtain the additional advantage of another layer of said metal adjacent thereto, the spoke nipples serving to hold the several layers of the metal together and prevent spreading of said seam. In the hollow form of a rim constructed according to my invention, I prefer to form at least one peripheral groove or depression D, and, as shown herein, this groove will be contiguous to the seam above specified, even in case it is found necessary or desirable to form other peripheral grooves in said rim. By having the rim grooved, in the manner shown and described, I facilitate the placing of spoke-nipples and avoid the necessity for puncturing any portion of said rim other than that actually engaged by said spoke-nipples.

The hollow rim above described is especially designed for a peculiar tire hereinafter described, although it may perhaps be employed in connection with other tires, but as the peripheral groove D is coincident to the preferred form of tire the latter may be placed on a solid rim made with such a groove or having a facing E of rubber or some other suitable material disposed in such a way as to form the groove or made with said groove therein, as shown in Fig. 6. Or this facing may be employed on any of the various hollow rims in common use, the object being to provide for the attachment of my peculiar tire to any of the well known rims either hollow or solid, and therefore it is possible to attach this tire to a hollow rim having a peripheral opening minus the walls and base necessary to the aforesaid groove.

The tire consists of an endless air-tube inclosed by a protective covering that seats against the rim and engages the peripheral groove or grooves that constitute an essential feature of the same, the air-tube and protective cover being preferably of such normal diameter as to require that they be stretched onto said rim, prior to inflation of said air-tube. The air-tube herein shown, comprises layers F, G, of rubber vulcanized to opposite sides of a layer H of fibrous material such as canvas cut bias, but as this peculiar layer of fibrous material, is an essential feature of the air-tube it may be disposed otherwise than between two layers of rubber, and it is not absolutely essential that said layer of fibrous material be integral with the rubber portion of said air-tube. In the preferred form of my tire, the protective covering I will have its edges flanged and provided with outturned flanges J that when brought together form a rib for engagement with the peripheral groove in either form of rim herein shown. The air-tube is to be provided with any suitable form of valve attached to a nipple $b$ thereon, this nipple being shown in Fig. 5. It is to be understood that the relative dimensions of the rim-groove and engaging rib are such as to insure a tight fit, and it is also to be understood that the rib formed by the abutting outturned flanges J of the cover are of such stiffness as to lock tight against the corners of said groove and be proof against withdrawal incidental to inflation of the expansible tube. From the fact that the sharp edges or corners of the peripheral opening in the rim act as fulcrums and the cover flanges are in frictional contact there is a leverage or resistance of each cover-flange against the other whereby both are automatically held in place.

When the tire is in position on the rim, the inflation of the air-tube will cause the latter to contract circumferentially, this contraction being due to the bias cut fibrous material. In other words the inflation of the air-tube causes an expansion of the same transversely at all points of its circumference, and as this expansion takes place there must necessarily be a contraction of the diameter of the circle formed by said tube, owing to the give and take nature of the fibrous material, when cut on the bias, its stretch in one direction being equalized by a corresponding shrinkage in another.

The contraction of the endless air-tube, as above described acts to bind the protective cover I on the rim, the rib of this cover formed by the flanges J, as well as any other exterior flanges that may be on said cover, being securely locked in a corresponding peripheral rim-groove or grooves, whereby this cover is held firmly in place as long as the aforesaid air-tube is under inflation.

To prevent slipping of the tire on the rim, I prefer to provide the outer rib of the protective cover with transverse corrugations $c$ that engage with the heads of the spoke nipples, this feature of my invention being clearly illustrated in Fig. 3.

By the construction and arrangement of parts, as above described, ready access may be had to the air-tube for the purpose of patching a possible puncture therein, and I provide for a highly resilient tire that will be automatically maintained in its position on the rim of the wheel, said tire and rim having the necessary relative features herein set forth, as essential to the results sought to be accomplished.

Having now fully described my invention, what I claim as new, and desire to secure by Letters Patent, is—

1. A wheel having the rim thereof made from a sheet of metal the longitudinal edges of which are folded and hooked together thereby forming a central seam, the resultant tube being bent to tightly close said seam against the opposite surfaces of the metal, whereby five thicknesses of this metal are laid close together throughout the line of the greatest strain on said rim, substantially as set forth.

2. A wheel having the rim thereof made from a sheet of metal the longitudinal edges of which are folded and hooked together to form a central seam, the resultant tube being formed with a peripheral groove having the seam for its base this base being close against the opposite surface of the metal, whereby five thicknesses of the latter are had throughout the line of greatest strain on said rim, substantially as set forth.

3. A wheel having its rim provided with a peripheral opening in combination with a tire comprising an air-tube diametrically contractible under inflation, and a protective covering for the tube provided with stiff outturned flanges that snugly engage the rim-opening and have their inner faces in frictional contact, whereby the sharp edges or corners of said rim-opening act as fulcrums and there is a leverage or resistance of each cover flange against the other, substantially as set forth.

4. A wheel having the rim thereof provided with a peripheral depression, in combination with an air-tube diametrically contractible under inflation, and a protective cover for the tube having outturned corrugated edges that abut together and fit tight in the rim-depression, said flanges being of such stiffness as to lock against the corners of said depression, substantially as set forth.

In testimony that I claim the foregoing I have hereunto set my hand, at Milwaukee, in the county of Milwaukee and State of Wisconsin, in the presence of two witnesses.

F. H. BOLTE.

Witnesses:
N. E. OLIPHANT,
H. H. MEIXSELL.